United States Patent

Couasnon

[11] Patent Number: 5,806,825
[45] Date of Patent: Sep. 15, 1998

[54] LOCKABLE SLIDE DEVICE FOR MOTOR VEHICLE SEATS

[75] Inventor: Christian Couasnon, Flers, France

[73] Assignee: Bertrand Faure Equipements S.A., Boulogne Cedex, France

[21] Appl. No.: 670,698

[22] Filed: Jun. 26, 1996

[30] Foreign Application Priority Data

Jul. 4, 1995 [FR] France .................................. 95 08214

[51] Int. Cl.⁶ ...................................................... B60N 2/08
[52] U.S. Cl. ............................................. 248/429; 296/63
[58] Field of Search .................................. 248/429, 430, 248/298.1; 297/344.1; 296/63, 68.1; 280/806

[56] References Cited

U.S. PATENT DOCUMENTS

| 4,463,922 | 8/1984 | Rees ........................................ 248/429 |
| 4,508,385 | 4/1985 | Bowman ............................... 248/429 X |
| 4,776,551 | 10/1988 | Nishino . | |

FOREIGN PATENT DOCUMENTS

| 0 098 702 | 1/1984 | European Pat. Off. . | |
| 0 411 842 | 2/1991 | European Pat. Off. . | |
| 2359006 | 2/1978 | France . | |
| 2489763 | 3/1982 | France . | |
| 2656262 | 6/1991 | France . | |
| 3532419 | 3/1987 | Germany ............................... 248/429 |
| 829449 | 3/1960 | United Kingdom ................... 248/429 |

*Primary Examiner*—Derek J. Berger
*Attorney, Agent, or Firm*—Pollock, Vande Sande & Priddy

[57] ABSTRACT

A slide device includes a female section piece of U-shaped cross section, a male section piece sliding longitudinally between the branches of the U in the female section piece, and a latch for longitudinally immobilizing the male section piece on the female section piece. The latch is formed of an end part of an elastically flexible blade which is fixed, at some distance from the end part, on one of the section pieces. The end part is provided with square teeth which, in a locked position, engage with notches made on the other section piece. The slide device includes unlocking means acting on the latch in order, by an elastic flexing of the blade, to disengage the square teeth from the notches.

10 Claims, 4 Drawing Sheets

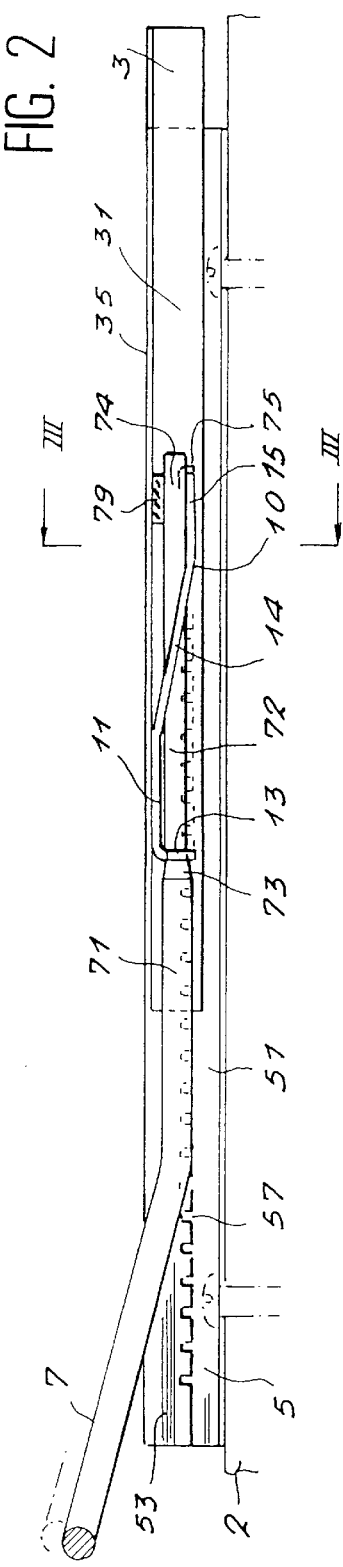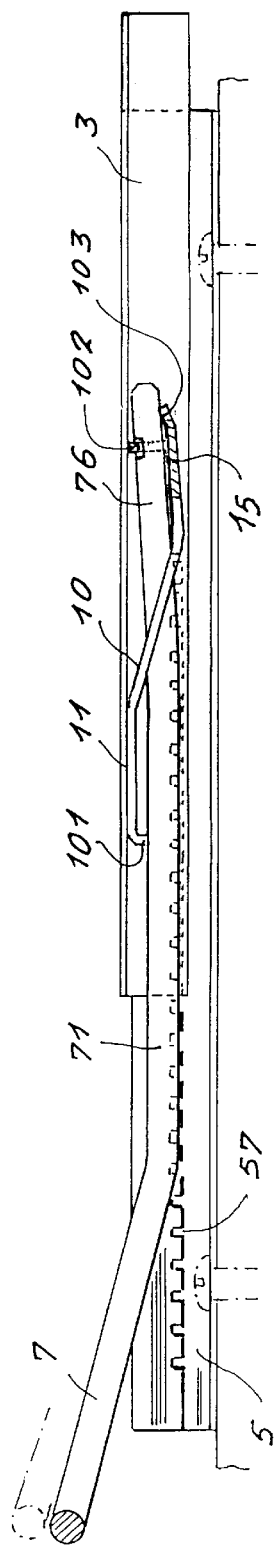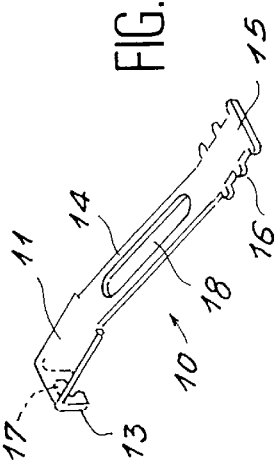

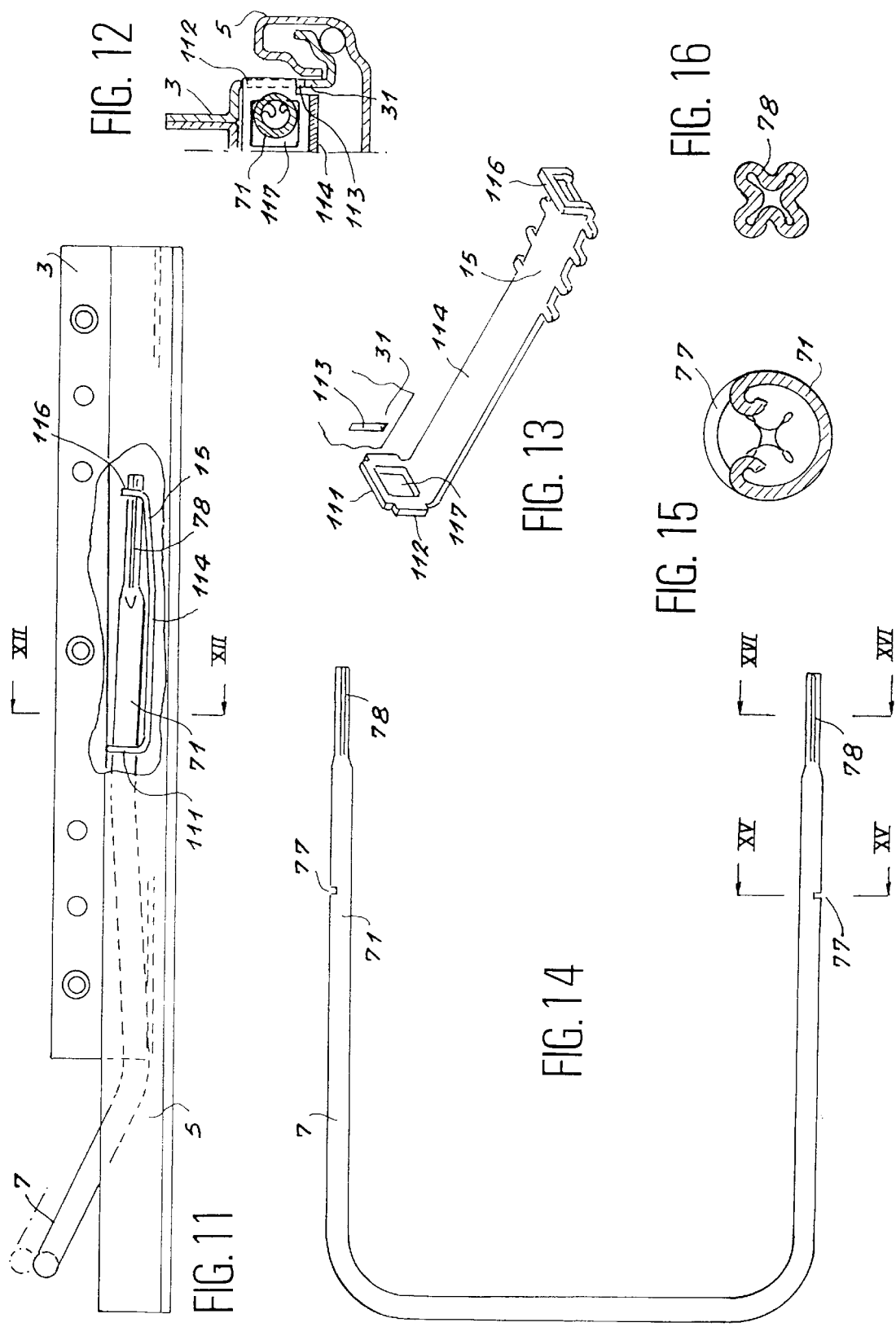

LOCKABLE SLIDE DEVICE FOR MOTOR VEHICLE SEATS

FIELD OF THE INVENTION

The present invention relates to a slide device that can be locked in position, for motor vehicle seats, especially front seats. These seats are mounted on slide devices to allow them to be adjusted in terms of longitudinal position and they have to be capable of locked, whatever position they are set in, in order to avoid any longitudinal travel.

BACKGROUND OF THE INVENTION

Various locking systems are already known, commonly based on the principle of bringing a latch associated with a mobile rail of the slide device (this mobile rail being fixed to the seat), into engagement with notches formed on a stationary rail integral with the floor of the vehicle. The latch is conventionally held in the locked position, in engagement with the said notches, by elastic return means. Unlocking is controlled by a lever, the maneuvering of which makes it possible to disengage the latch from the notches and thus allows the runner to slide and its position to be adjusted.

Slide devices are thus known which are formed of a male section piece and of a female section piece sliding one inside the other. The male section piece, having a cross section generally in the shape of a "U" includes, on one side, forming one arm of the "U", a series of notches, and the latch, carried by an arm pivoting on the female section piece, includes a plate provided with several orifices which engage over the said notches to provide the required longitudinal locking. In such a system, the part constituting the latch is situated on the outside of the slide device and therefore increases the bulk thereof. What is more, such a system makes it necessary to provide a part for articulating the latch on the slide device and a spring for returning the latch to the locked position.

The present invention aims to simplify the production of such locking systems by reducing the number of parts required, and to reduce the transverse spatial requirement of the slide devices.

BRIEF DESCRIPTION OF THE PRESENT INVENTION

With these objectives in mind, the subject of the invention is a slide device for a vehicle seat, including a female section piece of U-shaped cross section having two branches, and a male section piece sliding longitudinally between the said branches in the said female section piece. A latch is included for longitudinally immobilizing the male section piece on the female section piece. The latch is formed of an end part of an elastically flexible blade, the said blade being placed inside the slide device and fixed, at some distance from the said end part, on one of the said section pieces. The said end part is provided with teeth which, in a locked position, engage with notches made on the other section piece. The slide device includes unlocking means acting on the said end part of the blade in order to disengage the said teeth from the said notches, by an elastic flexing of the said blade.

By virtue of the invention, the number of parts is therefore reduced as far as possible because the said blade simultaneously provides for locking, using its teeth, and for elastic return to the locked position, using its inherent elasticity. What is more, the said blade is placed inside the slide device, that is inside the rails constituting the male and female section pieces. In this way, the locking members are protected by the rails of the slide device and the spatial requirement of the slide system is restricted to the external contour of these rails.

According to a first embodiment, the unlocking means include a balance bar comprising at least one arm articulated on a front end part of the blade and the end of this arm rests on the said end of the blade forming a latch.

According to a second embodiment, the unlocking means include a pivoting cam resting on tho end part forming a latch and controlled by a lever handle.

Other features and advantages of the invention will become clear in the description which will follow.

BRIEF DESCRIPTION OF THE DRAWINGS

Reference will be made to the attached drawings in which:

FIG. 2 a sectional side view of a slide device of this set in a first alternative form of this first embodiment;

FIG. 6 is a perspective view of the blade forming a latch in the first alternative form;

FIG. 7 is a side view in section of a second alternative form of the first embodiment;

FIG. 8 is a perspective view of the blade forming a latch in the case of this second alternative form;

FIG. 11 is a side view in section of a third alternative form of the first embodiment;

FIG. 12 is a view in section on the line XII—XII of FIG. 11;

FIG. 13 is a perspective view of the blade forming a latch used in this third alternative form;

FIG. 14 is a view from above of the unlocking balance bar used in this third alternative form;

FIG. 15 is a view in section of the balance bar on the line XV—XV of FIG. 14;

FIG. 16 is a view in section of the balance bar on the line XVI—XVI of FIG. 14.

DETAILED DESCRIPTION OF THE INVENTION

Figure 1:
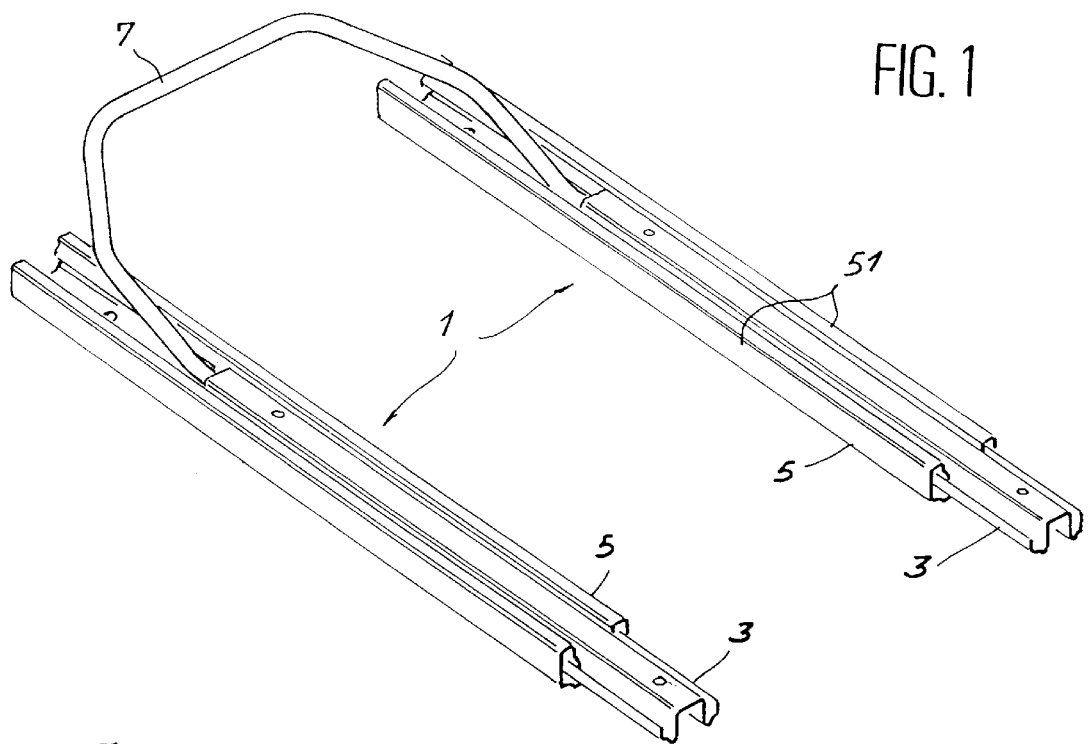
FIG. 1 is an overall perspective view of a set of slide devices in accordance with the first embodiment, that is to say the unlocking being controlled by a balance bar.
Figure 3:
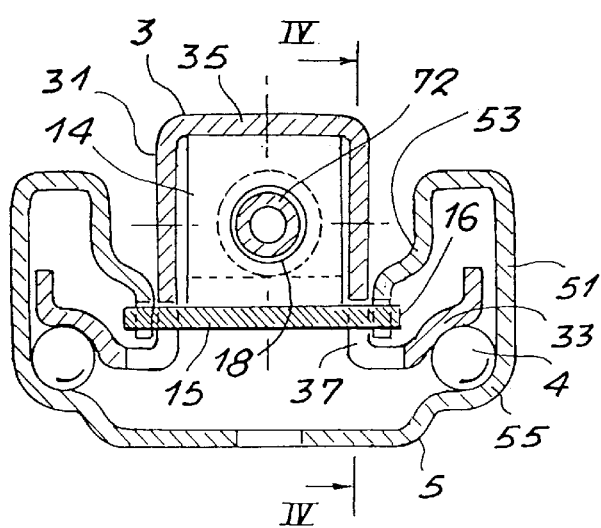
FIG. 3 is a view in section on the line III—III of FIG. 2.
Figure 4:
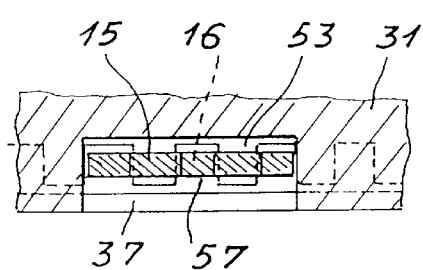
FIG. 4 is a partial view in section on the line IV—IV of FIG. 3, illustrating the locking link between the latch and the constitutives parts of the slide device.

The slide devices system represented in FIG. 1 consists of two parallel slide devices 1 each formed of a male section piece 3 sliding in a female section piece 5. The female section pieces are designed to be fixed to the floor 2 of a vehicle, and the framework of a seat, not represented, is fixed to the male section pieces. A control balance bar 7 is provided for unlocking the slide devices and allowing the position of the said seat to be adjusted. As will be seen later, unlocking may also be brought about using other means, for example a lever handle arranged on the side on one side of a slide device.

In the various alternative forms which will be described, the slide devices are made similarly as far as their sliding and positioning function is concerned. The female section piece 5 has a cross section in the overall shape of a U open at the top, including two branches 51 bent one towards the other and ending in a hook-shaped return 53 turned towards the inside of the section piece and downwards.

The male section piece 3 also has a cross section in the overall shape of a U, open at the bottom. The branches 31 of this U are extended, outwards and upwards, by a profiled return 33 which engages under the hook-shaped return 53 of the female section piece. The pro-filed returns 33 and the rounded internal corners 55 between the bottom of the U of the female section piece and its branches 51 constitute running tracks for balls 4 which are interposed there to make the relative sliding of the section pieces 3, 5 easier. Notches 57 are formed on the end edges of the hook-shaped returns 53, being spaced apart uniformly over at least part of the length of the female section piece 5, the said end edges lying adjacent to the branches 31 of the male section piece in the hollow formed between each of the said branches and the corresponding profiled return 33.

The foregoing description applies to the various alternative forms of the slide devices in accordance with the invention. The shape of the cross section of the rails and their relative layout, with a view to the sliding of one rail with respect to the other, can be modified without thereby departing from the scope of the present invention.

Referring specifically to FIGS. 2 to 6, the locking system used in the first alternative form of the first embodiment of the slide devices will now be described.

As can be seen in FIG. 2, inside the slide device is arranged a flexible blade 10 made, for example, of spring steel. This flexible blade, represented in perspective in FIG. 6, includes a fixing part 11 secured to the male section piece, being for example fixed by rivets (not represented) to the mounting bight section 35 of the U constituting the said male section piece. A front end part 13 of this blade runs, substantially perpendicular to the longitudinal direction of the slide device, from the said fixing part towards the bottom of the female section piece. On the other side of this front end part, the blade 10 is extended by an intermediate part 14 which extends obliquely downwards from the said front part, that is to say towards the bottom of the female section piece, and which ends in a rear end part 15 substantially parallel to the bottoms of the section pieces and which, as will be seen, constitutes the element for locking the male section piece to the female section piece.

This rear part 15 includes, on each side, square teeth 16 which extend laterally (see FIGS. 3 and 4) beyond the branches 31 of the male section piece 3, passing into openings 37 made for this purpose in the said branches, and engage in the notches 57 of the female section piece 5. The square teeth 16 pass, with minimum operating clearance in the longitudinal direction of the slide device, between the lateral edges of the said openings 37.

Hence, when the slide device is in the locked position as represented in the figures, the forces tending to cause the male section piece to slide in the female section piece are transmitted directly from the male section piece to the square teeth 16 (via the edge of the opening 37) and from these teeth to the notches 57 of the female section piece. Since the said notches are in the direct vicinity of the branches 31 of the male section piece, these forces create stresses in the blade 10 which are purely shear stresses on the square teeth. The other parts of the blade 10 are therefore not subjected to any stress when such forces are exerted and, as a consequence, the dimensions and weight of the blade can be particularly small.

Figure 5:
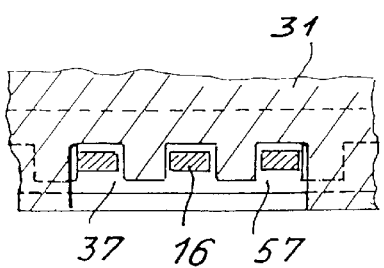
FIG. 5 is a view similar to that of FIG. 4, in another embodiment of the latch.

In another embodiment of the opening 37, represented in FIG. 5, the said opening 37 includes, on its upper edge, notches of the same width as the notches 57 of the female section piece, each of the square teeth 16 engaging both in one of the said notches of the edge of the opening and in a notch 57 of the female section piece. In this case, the shear forces between the male section piece and the latch formed by the end part 15 are borne by all the square teeth.

The blade 10 is preformed so that the square teeth interact with the notches of the female section piece, in order to lock the slide devices, when the blade is at rest without bending stresses, or with minimum stresses tending to push its rear end part 15 upwards.

In order to unlock the slide device and allow longitudinal adjustment of the seat, the slide device system includes unlocking means consisting, according to the first embodiment, of a balance bar 7 formed, for example, of a tube bent into a U, the arms 71 of which penetrate respectively inside each of the slide devices 1. In this first alternative form, each arm 71 includes a reduced-diameter terminal part 72 which is connected to it by a narrowed portion 73. The said terminal part passes into an orifice 17 made in the front end part 13 of the blade 10 and into an oblong slot 18 formed in the intermediate part 14.

The end 74 of the said terminal part 72 is in contact with the top side of the latch 15, which exerts a slight pressure due to a slight elastic deformation of the intermediate part 14 of the blade 10 on the said end 74 in order to keep the terminal part 72 radially in contact with the edges of the orifice 17 and of the slot 18. Furthermore, the arm 71 of the balance bar 7 is axially immobilized on one hand by the narrowed portion 73 abutting against the front end part 13 and on the other hand by a stop 75 formed by a folded-over portion of the tubular wall of the end of the balance bar. A buffer 79, for example made of rubber, is fixed to the bottom 35 of the male section piece 3, between this bottom and the latch 15, in order to prevent any possible direct contact of the terminal part 74 of the balance bar 7 with the bottom of the male section piece and thus avoid any risk of noise.

The slide devices are unlocked by pulling the balance bar upwards, which causes the terminal part 72 to pivot downwards and disengages the square teeth 16 from the notches 57, the front end part 13 of the blade 10 serving as an articulation point. The bending of the intermediate part 14 of the blade 10 which is brought about in this way creates a vertical force for returning the latch to the locked position as soon as the balance bar is released.

In the second alternative form, represented in FIG. 8, the slide device is locked in a similar way to the first alternative form, by the square teeth 16 of a flexible blade engaging with the notches 57 of the female section piece 5. Only the shape of the blade and the method by which the balance bar is attached to it are altered as follows.

In this second alternative form, the front end part of the blade 100 forms a shallow rim 101, as seen in FIG. 8, on which the arm 71 of the balance bar 7 rests, from below. The tube 76 constituting this arm has a diameter which is substantially constant right up to its end 74. The tube 76 passes into the slot 18 of the blade then into a ring 102 formed from the rear end part forming a latch, this ring stretching perpendicular to this part. Axial immobilization is provided by the ring 102 which engages in a groove made on the end 74 of the tube 76, the ring being immobilized in the groove elastically by means of the end 103 of the blade.

The slide devices are unlocked as indicated before for the first alternative form, by pulling the balance bar 7 upwards, the rim 101 acting as a pivot for shifting the latch 15 downwards.

Figure 9:
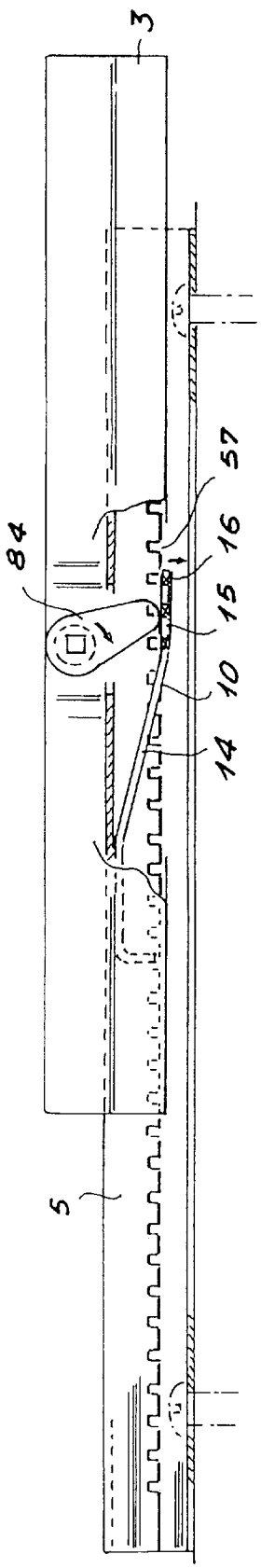
FIG. 9 is a side view in section of the second embodiment of the slide device, that is to say with an unlocking control on the side, using a pivoting lever.
Figure 10:
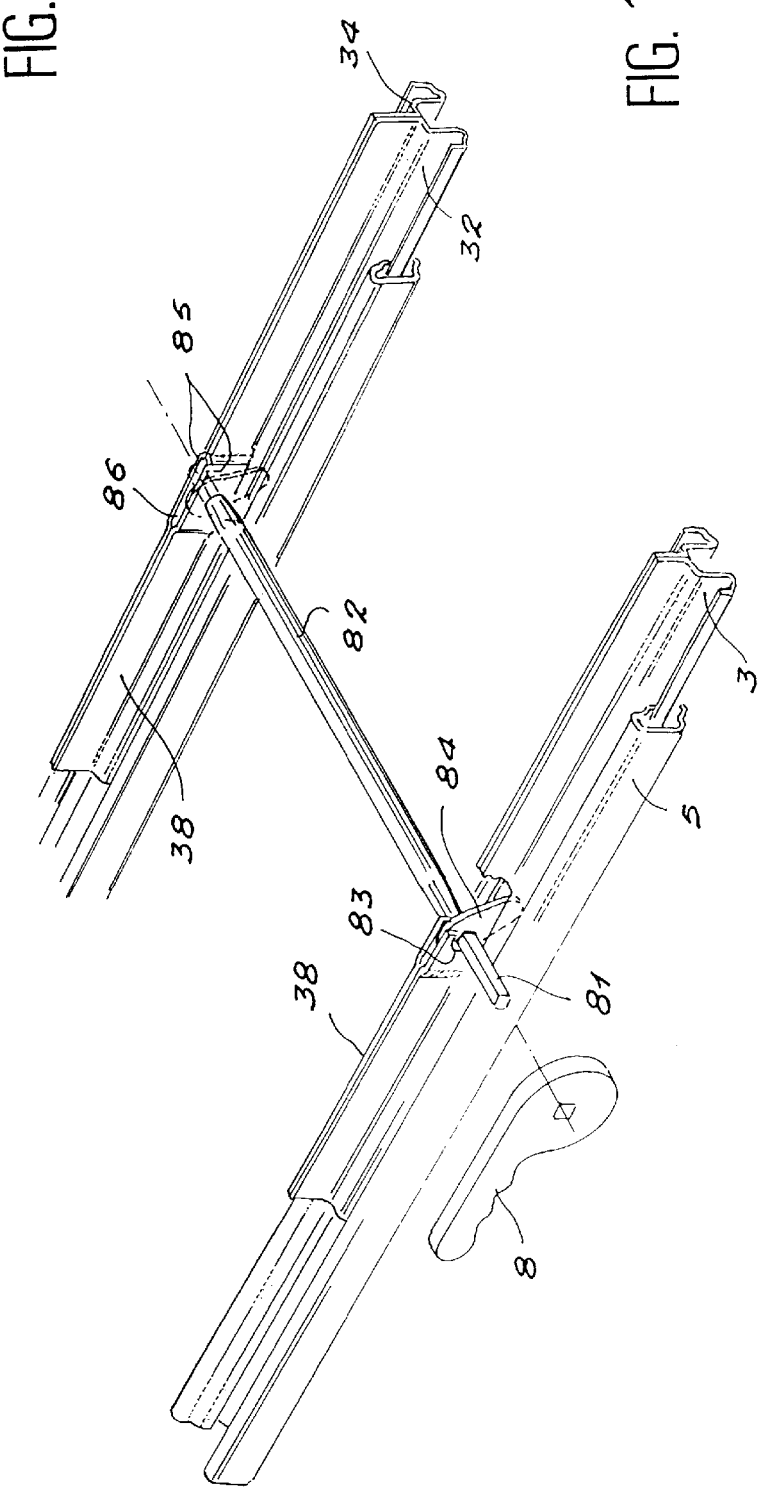
FIG. 10 is a perspective view of a set of slide devices according to this second embodiment.

The second embodiment will now be described in relation to FIGS. 9 and 10, in which unlocking is achieved not now by a balance bar but by a pivoting lever handle 8 on the side. This lever handle is mounted on a square drive 81 formed on a transverse shaft 82 which connects the two slide devices 1. The shaft 82 is mounted so that it can pivot in bearings 83 formed in branches 38 of the male section pieces 3, which run vertically upwards from the bottom 35 of the said section pieces. At these bearings, for each slide device, the shaft 82 carries a cam 84 which rotates integrally with it. The dimensions of this cam 84 are such that when the shaft 82 is driven in rotation by means of the lever handle 8, the lobe of the cam 84 comes to rest on the rear end part forming a latch 15 of the blade 10 in order to disengage the square teeth 16 from the notches 57 of the female section piece 5. As a preference, the shaft 82 and the cams 84 are returned to the locked position by a torsion spring, not represented, mounted between the shaft and the male section piece 3, the elastic return of the blade 10 serving merely to return the latch to a position in which its square teeth are engaged with the notches 57 of the female section piece.

It will be noted that this embodiment does not require the production of a slot in the intermediate flexible part 14. Furthermore, as seen in FIG. 10, the male section piece is preferably formed in two parts 32, 34 with the same contour, arranged symmetrically with respect to a vertical longitudinal mid-plane and joined together at the said upper branch 38, this making it possible for a hollowed shape 85 to be produced easily on each part 32, 34 in the region of the bearings 83 in order to house the cams 84 in the recess 86 obtained by the combination of these hollow shapes.

The drawings of FIGS. 11 to 16 illustrate a third alternative form of the first embodiment, in which the slide devices are unlocked under the control of a balance bar. The male section piece 3 is produced in two parts 32, 34 as indicated hereinabove. The blade 10 includes a front end part 111 provided on each side with lugs 112 which, engaging in corresponding slots 113 made in the vertical flanks of the two said parts 32, 34 constituting the branches of the male section piece, hold the blade in the said section piece. It will be noted that the fitting of the blade is made easier by the two-part construction of the male section piece 3. The intermediate part 114 of the blade 10 runs from the said front end part 111 towards the part forming a latch 15, on the same side as the bottom of the female section piece. A ring 116 is formed as a single piece with the blade at the end of its part forming a latch 15 and runs substantially vertically upwards from this part.

The arms 71 of the balance bar 7 pass into openings 117 formed in the front end parts 111 of each blade 10 of the two slide devices, and the ends 78 of these arms, with reduced cross section, are inserted in the rings 116. The balance bar 7 includes on its arms 71, symmetrically, transverse cutouts 77 which engage, by elastic spreading of the said arms when the balance bar is fitted into the blades 10, over the edges of the said openings 117 and immobilize it in translation. The small cross section of the ends 78 allows these to shift slightly in the ring 116 during the said elastic spreading of the arms.

The slide devices are unlocked as in the previous alternative forms using a balance bar, by pulling the latter upwards which causes it to pivot by bearing on the upper edge of the opening 117 and causes the part forming the latch 15 to shift downwards.

The invention is not limited to the various alternative forms described hereinabove merely by way of example, and encompasses all combinations of the various ways of fixing the blade to the male section piece, of connecting the unlocking means to the blade. For example, the way of fixing the blade between the branches of the male section piece, as represented in FIGS. 11 to 13, could just as easily be used in the alternative forms represented in the other figures.

I claim:

1. Slide device for a vehicle seat, including a female section piece of U-shaped cross-section having two branches, and a male section piece, of generally U-shaped cross-section, sliding longitudinally between the said branches in the said female section piece, and a latch for longitudinally immobilizing the male section piece on the female section piece wherein the latch is formed of an end part of an elastically flexible blade, the said blade being placed inside the slide device and fixed, at a pre-selected distance from the said end part, on one of the said section pieces, and the said end part being provided with teeth which, in a locked position, engage with notches made on the other section piece, and further wherein the slide device includes unlocking means acting on the said end part of the blade in order to disengage the said teeth from the said notches by an elastic flexing of the said blade.

2. Slide device according to claim 1, wherein the blade is fixed to a bight section of the male section piece.

3. Slide device according to claim 1, wherein the blade is fixed to branches of the male section piece.

4. Slide device according to claim 1, wherein the unlocking means include a balance bar comprising at least one arm articulated on a front end part of the blade opposite to the latch, said arm having an end which rests on the said end part forming said latch.

5. Slide device according to claim 4, wherein the arm of the balance bar is immobilized axially on the said blade by a narrowed portion butting against the front end part of the blade and a stop formed at the end of the arm.

6. Slide device according to claim 4, wherein the arm of the balance bar is connected to the blade by a ring formed on the end part forming said latch and in which the end of the arm is inserted.

7. Slide device according to claim 4, wherein the balance bar includes, on the arm, a transverse cutout which fits over an edge of an opening in the said front end part and through which the said arm passes.

8. Slide device according to claim 1 wherein the unlocking means include a pivoting cam resting on the end part forming said latch and operated by a lever handle.

9. Slide device according to claim 8, characterized in that the cam is mounted on a shaft pivoting in bearings (83) of the male section piece and housed in a recess of the said male section piece.

10. Slide device according to claim 1 wherein the one section piece has openings through which the teeth of the latch pass.

* * * * *